Patented June 14, 1949

2,473,370

UNITED STATES PATENT OFFICE 2,473,370

POUR POINT DEPRESSANT FOR OIL COMPOSITIONS

Russell J. Hawes, Cranford, William F. Behrman, Westfield, and Charles A. Campbell, Cranford, N. J., assignors to Tide Water Associated Oil Company, Bayonne, N. J., a corporation of Delaware No Drawing. Application September 25, 1947, Serial No. 776,148

15 Claims. (Cl. 196—151)

The present invention relates to novel compositions, and preparation thereof, adaptable for use as pour point reducing agents for mineral oils and to mineral oil compositions, particularly of lubricating grade, containing the novel pour point reducing agent.

It is already known that mineral oil compositions having high pour point characteristics, although satisfactory for usage for certain purposes, are not entirely suitable for other usages wherein satisfactory performance essentially requires compositions that do not congeal at low temperatures. For example, mineral oil compositions having low pour points are particularly desirable for lubrication purposes. In order to overcome undesirable high pour point characteristics of certain mineral oil compositions, otherwise suitable for lubricating purposes, a common practice followed by the art is to incorporate into such oils certain additives that function as pour point depressants. The art is aware of many materials suitable for such usage, examples of which include synthetically prepared materials and substances prepared by extraction of certain naturally-occurring constituents from mineral oils.

The present invention relates to novel pour point depressants for mineral oils that are prepared by controlled treatment of certain naturally-occurring constituents of mineral oils that are obtained by extraction from adsorbent material that has been used in mineral oil refining. It has been found that the novel compositions prepared in accordance with this invention are not only highly effective pour point depressants but also stabilize the pour point of oils exhibiting unstable pour point characteristics. These desired results are obtained when the novel composition, as embodied herein, is incorporated in minor proportional amounts by weight into oils having undesirable high and/or unstable pour point characteristics.

In the art of producing oils of lubricating grade from crude petroleum in accordance with modern refining and processing methods, crude petroleum is subjected to a primary distillation at temperatures effective to segregate selected fractions without substantial cracking of the crude. In this manner, light fractions, such as gasoline, kerosene, etc., intermediate fractions such as wax distillates, and a bottoms fraction commonly described as "unfiltered cylinder stock" are obtained. Depending upon the particular crude and the operating conditions employed, the primary distillation may be controlled to yield cylinder stocks having predetermined characteristics such as gravity, viscosity, and the like. Such cylinder stocks, although suitable per se for certain purposes, are not usually entirely suitable for many requirements, as for example, for certain lubrication usages, as they have undesirable high pour points and exhibit unstable pour points, i. e., the tendency of the pour point to increase upon standing or during heating and cooling over certain temperature ranges. For the most part, therefore, such unfiltered cylinder stocks are subjected to further processing to produce more highly refined mineral oil compositions of lubricating grade. Such processing may involve the steps of dilution with naphtha to facilitate subsequent handling, filtration of the thus-diluted cylinder stock, centrifuge dewaxing, and reduction by distillation to remove the naphtha diluent.

In the processing of unfiltered cylinder stocks to produce more highly refined lubricating compositions, the filtration for purposes of reducing the color of the oil is usually conducted by contacting the unfiltered cylinder stock with decoloring adsorbents, suitable materials for such purposes being well-known to the art and including various clays, fuller's earth, hydrated aluminas, aluminum silicates, and the like. Although various processes have been disclosed for such decolorizing filtration, the processes currently in wide usage commercially are the so called "contact" and "percolation" methods, the latter method being the most widely used. Although the present invention is not limited to the use of any specific method for such adsorbent filtration, the invention is described hereinafter, for the purpose of convenience in illustration, with particular reference to percolation filtration of unfiltered cylinder stocks as a means of obtaining spent adsorbent material as the source for extraction of adsorbed material to be subjected to a controlled treatment in accordance with this invention to provide the novel pour point depressant.

In the percolation method, a deep static bed of adsorbent material, e. g., fuller's earth is provided through which unfiltered cylinder stock is filtered or percolated. When the adsorbent material shows diminished activity due to having adsorbed color-imparting bodies from the oil, the oil flow is cut off. The thus-utilized adsorbent, which for convenience is hereinafter designated as spent adsorbent, is generally subsequently treated for removal and recovery of residual oil, reactivated by removal therefrom of color bodies adsorbed during the filteration, and re-employed as regenerated adsorbent for further oil refining.

Spent adsorbent, as obtained from the filtration process usually contains a substantial amount of adhering oil and color-imparting bodies adsorbed from the oil. Since the adhering oil is valuable as partially decolorized cylinder stock, it is customary practice to substantially recover such oil, and for such a purpose, spent adsorbents are usually subjected to initial washings with organic liquids that selectively remove adhering oil in preference to adsorbed color bodies. The washings obtained from such treatment for recovery of adhering oil are, if desired, subjected to further adsorbent filtration. Organic liquids suitable for selective removal of adhering oils are well-known to those skilled in the art and for purposes of illustration such organic liquids may include petroleum ether, naphtha of the non-aromatic or low aromatic content type, and the like. Although treatment of spent adsorbents with such selective organic liquids preferentially removes a substantial amount of the adhering oil, complete removal thereof does not generally occur. Hence, in order to increase recovery of residual oil and residual selective organic solvent, the thus treated spent adsorbents are usually purged with steam. The steam purge not only removes a substantial amount of the remaining adhering oil, but additionally, displaces or desorbs from the adsorbent a portion of the color bodies adhering thereto that are not soluble in or desorbable by the initially used selective organic liquid, and hence are not removed thereby. Due to the action of steam, a portion of the color bodies are displaced from the adsorbent. The displaced color bodies are not soluble in water (steam) and, hence, following the steam purge, the spent adsorbent is washed with a selective organic liquid, preferably of the type used in the initial washing of the adsorbent to remove adhering oil as stated hereinbefore. Naphtha of low aromatic content or similarly effective solvents may be employed to thus wash out the displaced color bodies. Hence, the washings recovered from such treatment generally contain a mixture of oil and color bodies that are not removable by the initial selective organic liquid wash but which, on being displaced from the adsorbent by the action of steam, are readily washed out by an organic liquid of the type having substantially no removal effect on the color bodies prior to their displacement or desorption from the spent adsorbent. Such washings which for convenience are designated herein as "cylinder washings" comprise the extracts which provide the starting materials for preparation of the novel compositions embodied herein effective for depressing and stabilizing the pour point of oils exhibiting high and unstable pour point characteristics. In general, the cylinder washings comprise adsorbent color bodies not removable from the spent adsorbent by organic liquids such as petroleum ether, non-aromatic naphtha or naphtha of low aromaticity, e. g., less than about 10% aromatics, but are desorbable from the spent adsorbent by the displacing action of steam. These cylinder washings may or may not contain residual oil that may still be present and which may be removed during the wash following the steam purge.

Steam purging of the spent adsorbent, as described hereinbefore, results in removal of a portion of the adsorbed color bodies readily displaced or desorbed by steam. Hence, even after steam purging to obtain cylinder washings, the spent adsorbent generally contains a substantial amount of color bodies that are not readily displaced by steam. In order to reactivate the adsorbents for further use in oil refining, the steam-purged adsorbents may be subjected to further treatment by selective desorbing liquids or by burning at elevated temperatures to remove the remaining adsorbed material and provide regenerated adsorbents.

The present invention is based on the discovery that cylinder washings, as hereinbefore described, are convertible to viscous materials highly effective for depressing and stabilizing the pour point of mineral oils by subjecting such cylinder washings to a controlled heat treatment effective to cause cracking and polymerization reactions between certain constituents of the cylinder washings. As one embodiment, the invention may be illustrated in its application to the production of the novel pour point depressant and stabilizer from adsorbents utilized in decolorizing treatment of unfiltered cylinder stocks derived from paraffin base crudes of Pennsylvania origin. As will be appreciated, however, other embodiments are contemplated as in the treatment of cylinder stocks obtained from crudes similar to or other than of Pennsylvania origin. It is to be clearly understood, therefore, that no limitation is intended to be expressed or implied in the particular selection of the following illustrative examples and embodiments employed to demonstrate the invention.

*Example*

Employing a pipe still and a fractionating column of the type commonly used for primary distillation of petroleum crudes, a paraffin base crude was subjected to selective fractional distillation without substantial, if any, occurrence of cracking of the crude. From the distillation, relatively dark, unfiltered cylinder stocks were obtained having a viscosity of about 150 Saybolt Universal seconds at 210° F.

The unfiltered cylinder stock was diluted in a ratio of 40 parts by volume of cylinder stock to 60 parts by volume of naphtha of low aromatic content, e. g., not more than about 10%, and the thus-diluted cylinder stock was subjected to percolation filtration using fuller's earth until the color of the cylinder stock was reduced to a value of 8 on the A. S. T. M. color scale. When the adsorbent material showed diminished activity due to having adsorbed coloring material from the unfiltered cylinder stock, the oil flow was cut off. The spent adsorbent was washed with naphtha of low aromatic content for selective removal of residual oil, and the washings recovered and recycled to filtration. The washed adsorbent was then purged with steam whereupon an additional amount of residual oil was removed as well as a portion of the adsorbed color bodies. The adsorbent was then washed with naphtha of low aromatic content and cylinder washings were obtained containing a major proportional amount by weight of color bodies desorbed by the steam purge. The thus-treated adsorbent was then subjected to burning at elevated temperatures to remove color bodies not desorbed by the steam purge and to provide reactivated adsorbent for further use in oil refining.

The cylinder washings recovered as aforedescribed had the following characteristics:

A. P. I. gravity _____ about 21 to 23
Flash point °F. _____ about 510 to 525
Viscosity at 210° F. (Saybolt Universal seconds) _____ about 220 to 253

The cylinder washings were subjected to treatment under controlled conditions employing a preheater, a reactor and a fractionating column. The cylinder washings were preheated in a gas-fired coil, and passed into the reactor in which back pressure was maintained to control the residence time of the cylinder washings. The effluent from the reactor was passed to the steam fractionating column and formed overhead and residuum fractions. The residuum fractions were evaluated both by physical test and by incorporating minor proportional amounts by weight thereof in a high, unstable, pour point, unfiltered cylinder stock obtained from primary distillation of Pennsylvania crude. The unfiltered cylinder stock, prior to incorporation of the residuum material, had the following pour history showing a high pour point and instability in pour point characteristics on standing:

| | Pour point, °F. |
|---|---|
| At 0 hours | 75 |
| At 24 hours | 80 |
| At 72 hours | 85 |

The following tabulation sets forth data illustrating conditions employed in preparation of several residuums as hereinbefore described. The tabulation also includes data illustrating the effective pour depressing properties imparted to the aforedescribed high pour point, pour point unstable, unfiltered cylinder stock by incorporating therein about 2% by weight of the residuum obtained from each example:

| Example Run No | 1 | 2 |
|---|---|---|
| Reactor Contact Time (minutes) | 30 | 31 |
| Temperature (° F.) Reactor Coil Outlet | 800 | 825 |
| Yield of Residuum from Cylinder Washings (Volume percent) | 25 | 24.0 |
| Residuum: API Gravity | 13.3 | 8.7 |
| Residuum: Viscosity at 210° F. (SUS) | 1,025 | 3,675 |
| Pour Point of Unfiltered Cylinder Stock (0 hours), ° F. | 75 | 75 |
| Pour Point of Unfiltered Cylinder Stock on addition of 2% by weight of Residuum (0 hours), ° F. | 25 | 25 |

As evidenced by the data in the foregoing tabulation, in each case, the high pour point of the unfiltered cylinder stock was substantially depressed by incorporation of about 2% by weight of residuum from each of the runs. Additionally, in each case, the unstable pour point of the cylinder stock was stabilized after 24 hours as shown by the pour history set forth hereinafter, which for comparison includes corresponding data relating to the unfiltered cylinder stock devoid of the pour point depressing and stabilizing agent.

| | Pour Point | | |
|---|---|---|---|
| | 0 hours | 24 hours | 72 hours |
| | °F. | °F. | °F. |
| Untreated Cylinder Stock | 75 | 80 | 85 |
| Cylinder Stock plus 2% by weight of Residuum (Run 1) | 25 | 40 | 40 |
| Cylinder Stock plus 2% by weight of Residuum (Run 2) | 25 | 35 | 35 |

In each of the foregoing examples, the conditions employed, particularly as to temperature and time to which the cylinder washings were subjected, were effective to cause cracking of certain constituents of the washings as evidenced by the fact that considerable gas evolution occurred. For example, in run No. 2 gas evolution occurred to the extent of about 130 cubic feet per barrel of cylinder washings charged to the controlled heat treatment. Subjecting of the cylinder washings to conditions effective to cause cracking to occur is an important aspect of the present invention as it has been found that unless cracking occurs, the cylinder washings per se, or residual fractions thereof such as obtained by evaporation and/or fractional distillation without substantial cracking, do not result in highly effective pour point depressants and pour point stabilizers for mineral oil compositions. During the controlled treatment of cylinder washings as embodied herein, condensation reactions such as polymerization and alkylation of the cracked products with themselves and with uncracked constituents also occurs as evidenced by the viscosities of the residuums obtained which are much higher than would be obtained by low temperature vacuum reduction of the cylinder washings to corresponding residuum yields. Thus, in broad aspect, the present invention embodies the heat treatment of cylinder washings at temperatures high enough to effect cracking but not in excess of temperatures effective to enable condensation type reactions to occur. In practicing the invention, various modifications may be employed to obtain desired results. For example, it is within the scope of the invention to employ two reaction zones, the first zone being maintained at temperature, as for example, about 840 to 900° F., effective to cause cracking of the cylinder washings, and the second zone at a lower temperature, e. g., about 800 to 840° F., enabling the condensation reactions to occur. In general, however, one reaction zone is employed and maintained under controlled conditions of temperature, time, etc., wherein cracking of certain constituents of the cylinder washings and condensation reactions occur in the same reaction zone.

Although, as in the foregoing examples, certain conditions have been set forth for obtaining cylinder washing residuums having desired pour point depressing and stabilizing characteristics, the present invention is not to be considered limited thereto, but embodies use of conditions varying therefrom, the actual conditions employed being varied depending on factors such as the particular cylinder stocks employed as a source of cylinder washings, the particular mineral oil compositions to be treated for pour point depression and stabilization, the actual results desired, and the like. However, the conditions set forth in the foregoing examples suitably serve to illustrate specific and highly suitable conditions for treating cylinder washings from spent adsorbents resulting from decolorization filtration of cylinder stocks, particularly stocks derived from Pennsylvania crudes. Such specific conditions fall within the following ranges of preferred conditions which by investigation have been found to provide highly effective results as embodied herein.

| | Preferred Ranges |
|---|---|
| Temperature | about 750–900° F. |
| Contact Time | at least about 20 minutes e. g., 20 to 35 minutes. |
| Gas formation per barrel of cylinder washings charged | at least about 70 cubic feet. |

In practice of the invention, temperatures which are substantially in excess of about 900° F. or below about 750° F. are not generally employed, as under certain conditions, excessively high or excessively low temperatures appear to provide residuums that do not exhibit the optimum in pour point depressing and stabilizing characteristics for mineral oil compositions. Generally speaking therefore, and particularly for treatment of cylinder washings derived from Pennsylvania crudes, temperatures of 750 to 900° F. are used, the lower the temperature employed, the longer is the contact time usually required to obtain desired results. In a still more preferred embodiment, the present invention relates to treatment of cylinder washings, as aforedescribed, at about 800 to 850° F. as at such temperatures the desired cracking and condensation reactions occur to an extent and at a rate providing highly effective results. With particular reference to cylinder washings derived from Pennsylvania crude, as for example, the cylinder washings such as used in the foregoing examples, it is preferred that the heat treatment be conducted at about 800 to 850° F. for about 20 to 35 minutes to obtain a residuum yield of about 20 to 25% by volume based on cylinder washing charge, and having an A. P. I. gravity not exceeding about 15 and a viscosity (S. U. S.) of more than about 900 at 210° F.

In the foregoing description of the invention relating to preparation of the novel pour depressants, it has been set forth that the cylinder washings, when subjected to the controlled heat treatment, provide a residuum and an overhead fraction. Whereas the residuum comprises the pour point depressant and stabilizer as embodied herein for use in mineral oils, the overhead fraction may be recovered and processed, such as by fractional distillation, to remove valuable and desired materials therefrom. Thus, for example, and with particular reference to treatment of cylinder washings obtained from Pennsylvania crudes, it has been found that by fractional distillation of the overhead fraction gasoline, kerosene, gas oil, raw neutral, a residuum and the like, may be obtained and by further processing, such as by dewaxing, solvent extraction, and filtration, a highly refined neutral oil stock may be obtained from the raw neutral.

The residuums obtained by treatment of cylinder washings as embodied herein, may be employed as pour point depressants and stabilizers for highly refined mineral oils, as for example, a mineral oil of lubricating grade having an undesirable high and unstable pour point or may be employed for similar purposes in unfiltered cylinder stocks, having undesired pour characteristics but otherwise usable without further processing for certain purposes, as for example, for steam engine lubrication. Moreover, the novel pour depressants, as embodied herein, may be incorporated in crude petroleum prior to primary distillation thereof whereupon cylinder stocks and certain refined fractions recoverable therefrom exhibit lower and more stable pour properties as compared to distillation of the crude without incorporation of the novel pour depressant. In treating crudes in this manner, it has been found that when incorporated into the crude prior to primary distillation thereof, the pour depressant is not substantially, if at all, altered or removed during the distillation under normally employed conditions.

The novel pour depressant obtained as embodied herein as a residuum from controlled treatment of cylinder washings is generally dark in color. Hence, when incorporated in mineral oils, the pour depressant is preferably employed in an amount not substantially in excess of the concentration required to effect the desired pour point depression and stabilization, particularly wherein undue increase in color of the blended composition is undesirable. Moreover, in incorporating the novel pour point depressant in crudes, unfiltered cylinder stocks, highly refined mineral oil compositions, and the like, moderate heating, e. g., up to about 200° F. may suitably be employed to facilitate and promote solution of the inhibitor in the oils. In practicing this invention, the amount of the pour depressant and stabilizer incorporated into the mineral oil compositions may be varied over rather wide limits, the actual concentration employed being dependent upon the character of the mineral oil composition to be treated, and the degree of pour point depression and stabilization desired. Thus for example, it has been found that a concentration of up to about 2% or even higher may be employed with satisfactory results although for many purposes it is not necessary to use a concentration exceeding about 2%. For instance, in the particular examples set forth hereinbefore, about 2% by weight of the pour point depressant was found to be highly effective for treatment of the particular unfiltered cylinder stocks derived from Pennsylvania crude. However, it is within the scope of this invention to use concentrations higher than about 2%, as for example, up to about 5% for similar or different mineral oil compositions that contain relatively high wax contents. In a preferred embodiment, concentrations of from about 0.1 to 2% by weight of the pour point depressant and stabilizer are employed in practicing the invention.

It should be apparent from the foregoing description of my invention that various apparatus and procedures may be employed for preparing the novel compositions from cylinder washings and yet obtain desired results. Also, it should be understood that the preferred conditions set forth hereinbefore apply to the particular cylinder washings employed in the examples, and hence, that these conditions may be varied, depending on particular cylinder washings used, results desired, and the like, without departing from the scope of the invention.

The exact reactions that occur during the controlled treatment of cylinder washings, as embodied herein, are not fully understood due to the complexity of the compositions extracted from the spent adsorbents and the chemistry involved. However, as evidenced by the considerable gas evolution that occurs during the controlled treatment of the cylinder washings, cracking of certain constituents thereof occurs, and as hereinbefore described, use of cracking conditions is an important aspect of the invention. Although it is not intended that the invention be limited to possible theoretical explanations underlying the production of highly effective pour point depressants and stabilizers as embodied herein, it is believed that by subjecting the cylinder washings to the controlled conditions of treatment effective to cause cracking to occur, the products resulting from the cracking undergo reactions such as polymerization and alkylation, and hence, that the conditions of treatment suffice to enable both cracking and polymerization to occur. Thus, for example, temperatures in excess of about 900° F. are not generally employed, as under certain conditions, the product obtained does not appear to provide the optimum in pour point depressing and stabilizing effect. It is believed that by use of excessively high temperatures, an increase in the rate of cracking occurs without a corresponding increase in the rate of polymerization. Similarly, temperatures of less than about 750° F. are not generally used, as at such temperatures the degree to which cracking occurs is believed insufficient, except at very long reaction times, to provide a sufficient amount of cracked products that are capable of undergoing polymerization. On the other hand, employing suitable conditions on the order of those described hereinbefore, it appears that cracking and polymerization of the cracked products proceeds to a degree and at a rate effective to provide cylinder washing residuums having the desired characteristics as embodied herein.

As is apparent from the foregoing description of the invention, the novel compositions prepared from cylinder washings in accordance with this invention are highly effective per se as pour point depressants and stabilizers, without necessity of their use in combination with other pour depressants, such as certain synthetic materials, as heretofore proposed.

Obviously, many modifications and variations of the invention, as hereinbefore set forth, may be made without departing from the scope thereof and therefore, only such limitations should be imposed as are indicated in the appended claims.

We claim:

1. A method for preparing a composition, adapted for depressing and stabilizing the pour point of a mineral oil having an undesirably high and unstable pour point, from a solid subdivided adsorbent containing color-imparting carbonaceous bodies adsorbed from a fraction obtained by fractional distillation without substantial cracking, of a mineral oil, which comprises (a) extracting from said adsorbent color bodies adsorbed from said oil which are readily displaceable from said adsorbent by purging said adsorbent with steam but not substantially removable from said adsorbent by non-aromatic naphtha and (b) substantially cracking the extract thus obtained to obtain residuum effective as a pour point depressant and pour point stabilizer when incorporated in a minor proportional amount by weight in a mineral oil having an undesirably high and unstable pour point.

2. A method, as defined in claim 1, wherein the extract is subjected to substantial cracking at about 750 to 900° F.

3. A method, as defined in claim 1, wherein the residuum is obtained by subjecting the extract to a temperature of about 750 to 900° F. for about 20 to 35 minutes.

4. A method for preparing a composition, adapted for depressing and stabilizing the pour point of an undesirably high, unstable pour point mineral oil, from a solid, subdivided adsorbent containing color-imparting bodies adsorbed from a fraction obtained by fractional distillation, without substantial cracking, of a mineral oil, which comprises purging said adsorbent with an organic liquid effective to selectively remove oil adhering to said adsorbent without substantially removing adsorbed color-bodies, subjecting the thus-purged adsorbent to a steam purge to obtain an extract comprising color-bodies readily displaceable from said adsorbent by steam, and subjecting said extract to a temperature of about 750 to 900° F. for about 20 to 35 minutes to obtain a residuum effective as a pour point depressant and pour point stabilizer when incorporated in a minor proportional amount by weight in a mineral oil having an undesirably high and unstable pour point.

5. A composition comprising (a) a mineral oil in major proportional amount, said mineral oil being characterized by having an undesirably high and unstable pour point, blended with (b) a minor amount, sufficient to depress and stabilize the pour point of said oil, of a viscous residuum obtained by subjecting to substantial cracking color-imparting bodies displaceable by steam from a solid subdivided adsorbent but not substantially displaceable therefrom by non-aromatic naphtha, said color-imparting bodies having been adsorbed by said adsorbent from a fraction obtained from fractional distillation, without substantial cracking, of a petroleum crude.

6. A composition, as defined in claim 5, wherein the mineral oil of undesirably high and unstable pour point is blended with from about 0.1 to 5% by weight of the pour point depressing and stabilizing residuum.

7. A composition, as defined in claim 5, wherein the pour point depressing and stabilizing residuum comprises the residuum prepared by subjecting the steam displaceable color-imparting bodies to substantial cracking at a temperature of about 750 to 900° F.

8. A composition, as defined in claim 5, wherein the pour point depressing and stabilizing residuum comprises the residuum obtained by subjecting the steam displaceable color-imparting bodies to substantial cracking at a temperature of about 750 to 900° F. for at least about 20 minutes.

9. A composition, as defined in claim 5, wherein the pour point depressing and stabilizing residuum comprises the residuum obtained by subjecting the steam displaceable color-imparting bodies to a temperature of about 750 to 900° F. for about 20 to 35 minutes.

10. A composition, adaptable for usage as a pour point depressing and stabilizing additive for mineral oils, comprising the residuum obtained by subjecting to substantial cracking color-imparting bodies displaceable by steam from a solid subdivided absorbent but not substantially displaceable therefrom by non-aromatic naphtha, said color-imparting bodies having been adsorbed by said adsorbent from a fraction, containing color-imparting bodies, resulting from fractional distillation, without substantial cracking, of a petroleum crude.

11. A composition, as defined in claim 10, wherein the residuum is prepared by subjecting the steam displaceable color-imparting bodies to substantial cracking at a temperature of about 750 to 900° F.

12. A composition, as defined in claim 10, wherein the residuum is prepared by subjecting the steam displaceable color-imparting bodies to substantial cracking at a temperature of about 750 to 900° F. for at least about 20 minutes.

13. A composition, as defined in claim 10, wherein the residuum is prepared by subjecting the steam displaceable color-imparting bodies to a temperature of about 750 to 900° F. for about 20 to 35 minutes.

14. In the processing of a petroleum crude by subjecting said crude to fractional distillation, without substantial cracking, to remove lighter components of the crude as distillates and heavier components as a residual fraction, an improved method providing for obtainment of a residual fraction having a depressed pour point which comprises subjecting to said fractional distillation a petroleum crude blended with a minor amount by weight of a residuum prepared by subjecting to substantial cracking color-imparting bodies displaceable by steam but not substantially displaceable by non-aromatic naphtha from a solid subdivided adsorbent, said color-imparting bodies having been adsorbed by said adsorbent from a color-imparting body-containing-fraction resulting from fractional distillation, without substantial cracking, of a petroleum crude.

15. A method, as defined in claim 14 wherein the residuum is prepared by subjecting said steam displaceable color-imparting bodies to a temperature of about 750–900° F. for about 20 to about 35 minutes.

RUSSELL J. HAWES.
WILLIAM F. BEHRMAN.
CHARLES A. CAMPBELL.

REFERENCES CITED

The following references are of record in the file of this patent:

UNITED STATES PATENTS

| Number | Name | Date |
|---|---|---|
| 1,566,000 | Hanna et al. | Dec. 15, 1925 |
| 1,869,608 | Miller | Aug. 2, 1932 |
| 2,023,369 | Limburg | Dec. 3, 1935 |
| 2,024,106 | Levin | Dec. 10, 1935 |
| 2,037,563 | Curtis | Apr. 14, 1936 |
| 2,071,481 | Winning et al. | Feb. 23, 1937 |
| 2,084,510 | Showalter | June 22, 1937 |
| 2,200,534 | Bray | May 14, 1940 |